United States Patent [19]

Lambourn

[11] Patent Number: 4,677,785
[45] Date of Patent: Jul. 7, 1987

[54] AERATED LIVE BAIT BUCKET

[76] Inventor: Robert G. Lambourn, 3412 W. Fairway Dr., McHenry, Ill. 60050

[21] Appl. No.: 792,048

[22] Filed: Oct. 28, 1985

[51] Int. Cl.$^4$ ............................................. A01K 97/04
[52] U.S. Cl. .......................................... 43/55; 43/57; 261/121.2
[58] Field of Search ................... 43/55, 56, 57; 119/3, 119/5; 261/121 M

[56] References Cited

U.S. PATENT DOCUMENTS

| 1,939,583 | 12/1933 | Welshausen | 119/5 |
|---|---|---|---|
| 3,191,337 | 6/1965 | Fant | 43/57 |
| 3,216,650 | 11/1965 | Thyreen | 43/57 |
| 3,217,444 | 11/1965 | Howard | 43/57 |
| 3,815,277 | 6/1974 | Murray | 43/57 |
| 4,037,349 | 7/1977 | Key | 43/57 |
| 4,462,180 | 7/1984 | Scott | 43/57 |

Primary Examiner—Nicholas P. Godici
Assistant Examiner—G. M. Reid
Attorney, Agent, or Firm—Haight & Hofeldt

[57] ABSTRACT

A self-contained aerated live bait bucket having a base extension below the bottom of the bucket which together with a base plate at the lower end of the base extension forms a cavity in which is mounted a battery, an electrical motor and an air pump energized by the battery through a switch which is also mounted in the cavity. Air is supplied from the air pump to the water in the bucket by way of a check valve through an aperture in the bottom of the bucket.

17 Claims, 9 Drawing Figures

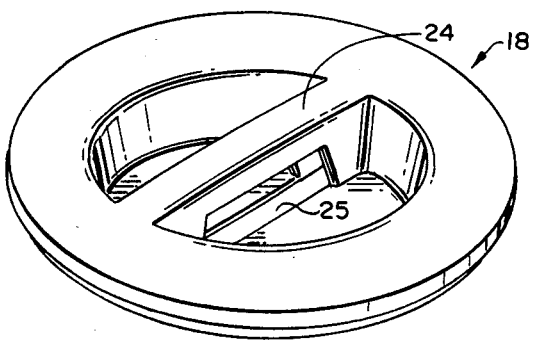
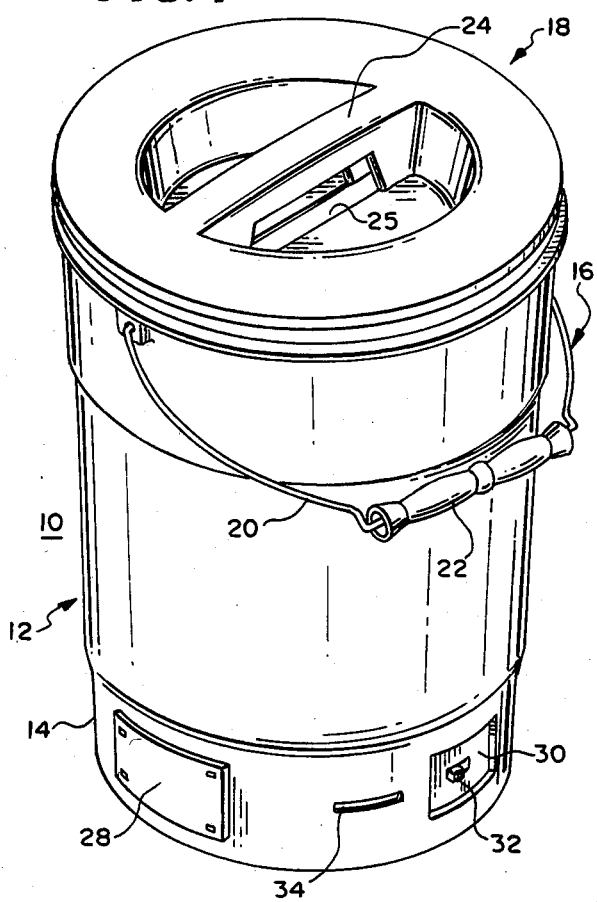
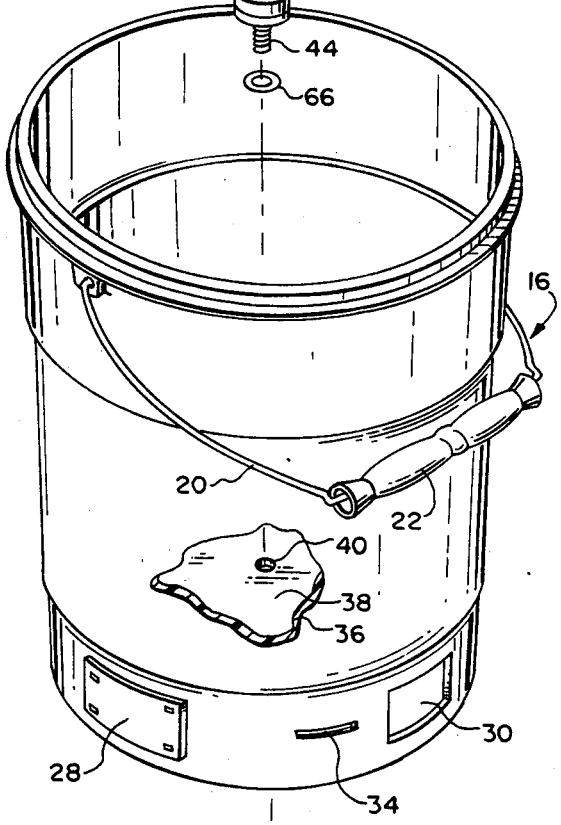
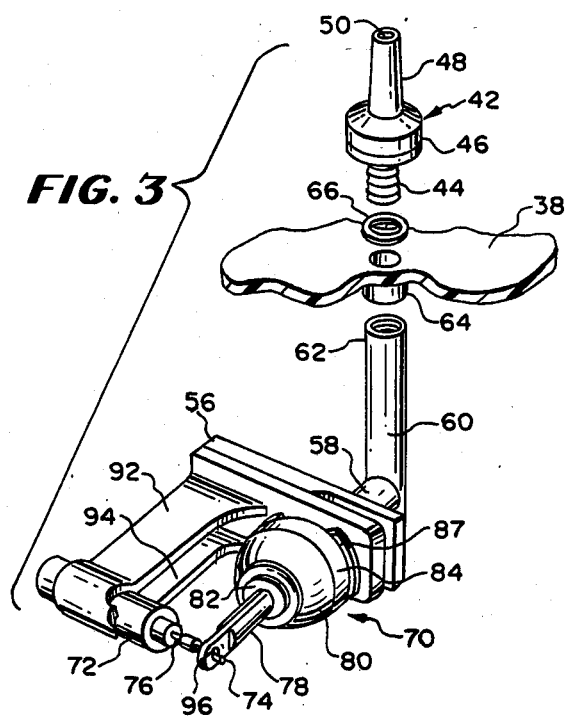
FIG. 1
FIG. 2
FIG. 3

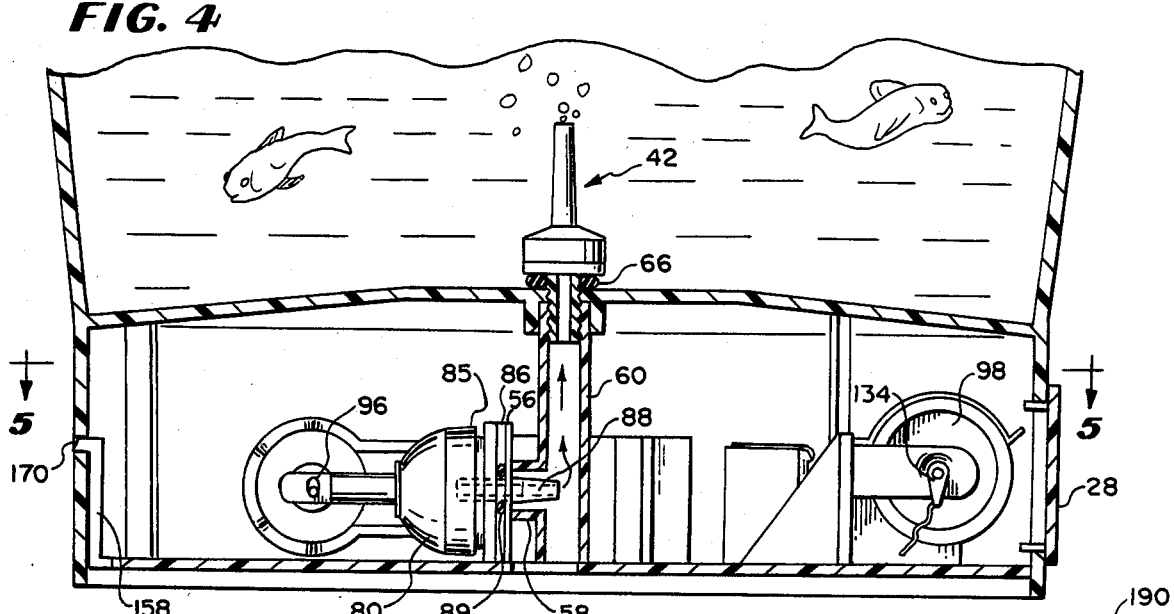
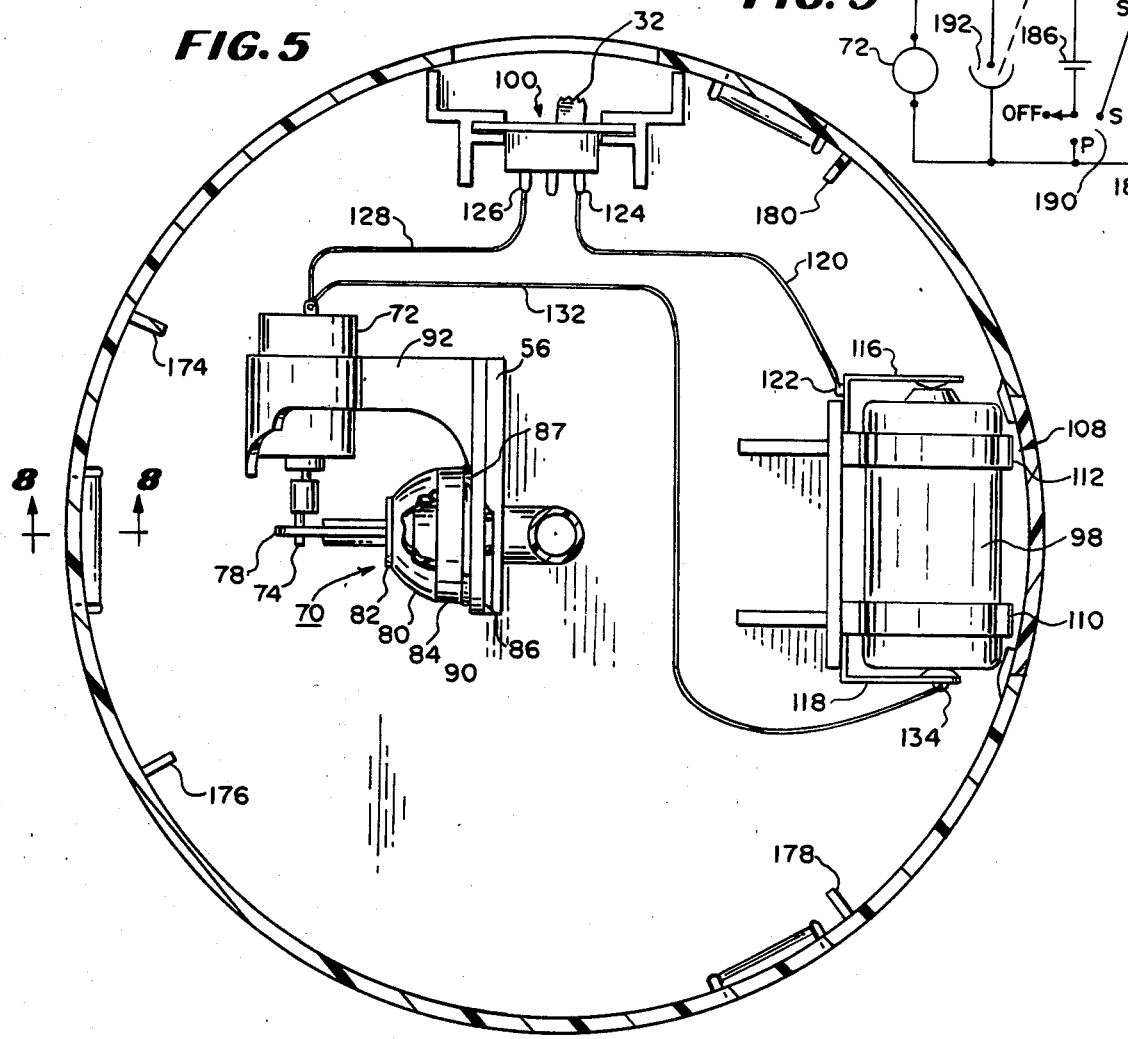

FIG. 6
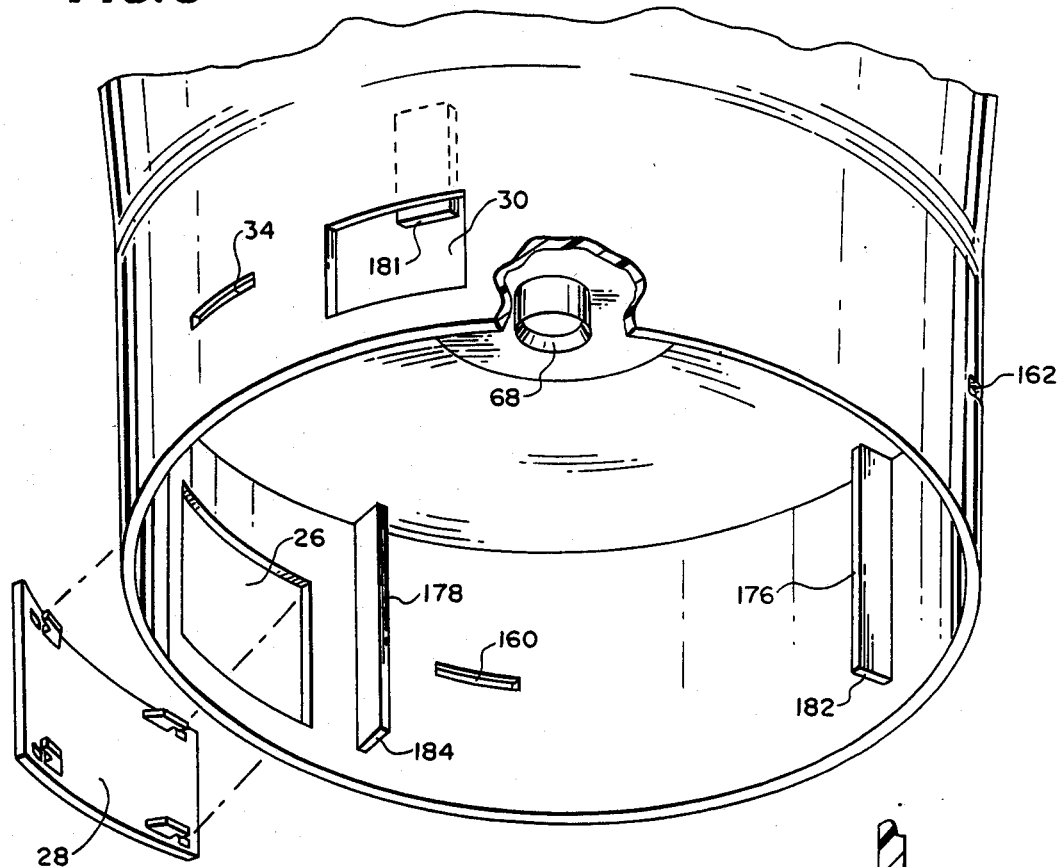
FIG. 7
FIG. 8
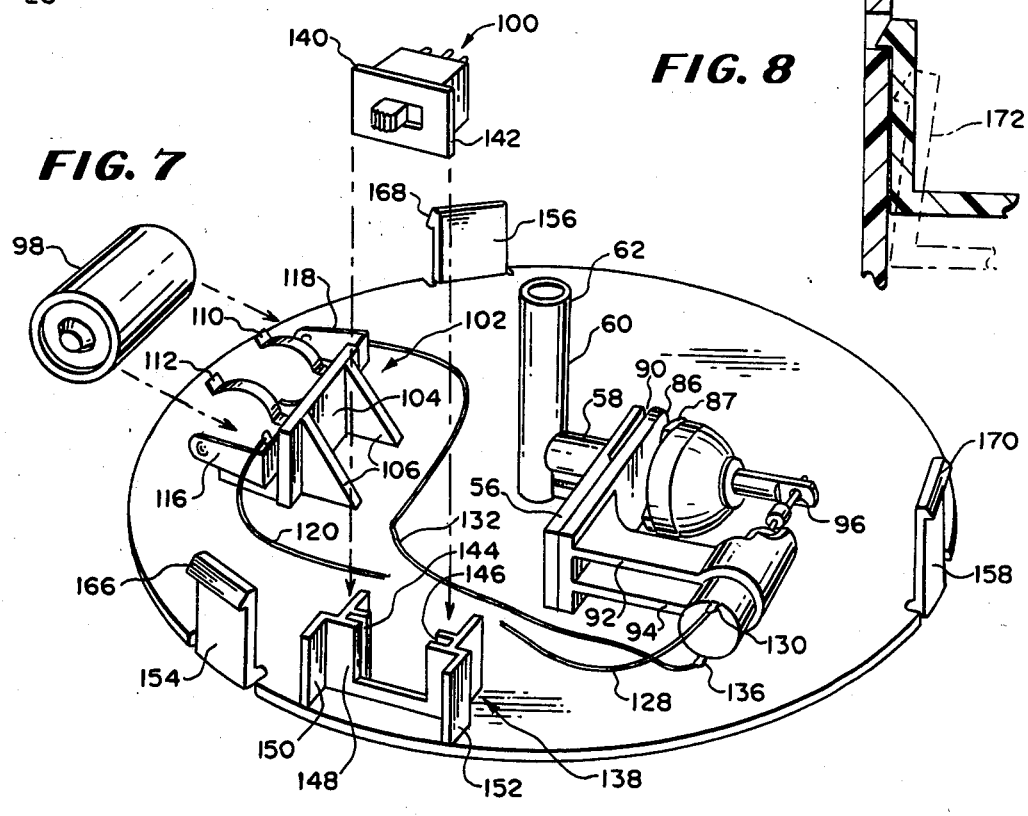

AERATED LIVE BAIT BUCKET

BACKGROUND OF THE INVENTION

This invention relates generally to live bait buckets, and more particularly to a live bait bucket provided with an aeration means for increasing the oxygen content of the water in the bucket so as to prolong the life of the live bait kept in the bucket.

While a great number of live bait buckets have been sold and are in use which do not include aeration devices, unless the water in these buckets is changed as the oxygen content drops, the live bait will not survive. Separate or detachable aeration devices have been provided for use with such buckets, for instance those shown in U.S. Pat. Nos. 3,189,334 and 3,216,650. Such devices are not only cumbersome at times to use, but are also relatively expensive since they include a separate housing, and usually means for attachment to the live bait bucket. Further, means may not be provided for assuring dispersement of the air into the water at the bottom of the bucket, which is believed to be most efficient dispersement location. Others have provided manually actuated means for forcing air into the water, such as are shown in U.S. Pat. Nos. 3,348,330 and 4,037,349. Finally, live bait containers have been provided with built-in aeration devices. Examples are these shown in U.S. Pat. Nos. 3,191,337, 3,217,444, 3,815,277, and 4,462,180. U.S. Pat. Nos. 3,191,337 3,217,444 and 4,462,180 all show integral aeration devices wherein air is introduced to the water at the bottom of the container. However, U.S. Pat. No. 4,462,180 does not discloses any of the details of the aeration construction. One can only speculate on what prevents the water from flowing back into the pump with consequential damaging effects. U.S. Pat. No. 3,217,444 discloses a live bait storing device wherein an air pump is located under the water container. A U-shaped tube is provided, with the base of the U presumably always above the highest water level, so as to prevent the flow of water back into the pump, even if by siphoning action. However, one must realize, that if for any reason the pressure is less at the lower end of the tube connected to the pump, which is at a lower level than the end of the tube extending to the bottom of the water, water will be siphoned into the pump, with obvious deleterious effects. Further, the live bait storing device shown in U.S. Pat. No. 3,217,444 is of considerably more complex construction than the device of the present invention, with obviously higher manufacturing costs. The live bait buckets shown in U.S. Pat. Nos. 3,191,337 and 4,462,180 both utilize a container within another container which not only adds to their cost, but also makes the units less convenient to use.

Thus, there still remains a need to provide a self contained aerated live bait bucket which is economical to construct and operate, convenient to use, and which eliminates the possibility of water leakage through the aeration system, while still introducing the air at the bottom of the water.

SUMMARY OF THE INVENTION

Accordingly, it is an object of this invention to provide a self contained aerated live bait bucket which is economical to construct and operate, convenient to use, and which eliminates the possiblity of water leakage through the aeration system, even though the air is introduced at the bottom of the bucket. In accordance with the present invention, a self contained aerated live bait bucket is provided in the form of a bucket having a base extension extending below the bottom of the bucket to form a cavity under the bucket. A base plate is provided to substantially close the lower end of the cavity, being secured to the base extension by latching means in the form of one or more arms extending from the base plate with a projecting tooth at the free end of the arm which engages a notch in the base extension. Contained within the cavity are an air pump, an electric motor to drive the air pump, and a battery to supply electrical energy to the electric motor. An aperture is provided in the bottom of the bucket such that the air pump can supply air through a check valve and the aperture to the water in the bucket. The check valve, which prevents water from flowing out of the bucket through the aperture, is mounted in the aperture with an inlet portion extending through the aperture to the cavity. A battery holder, the air pump, and an electric switch for controlling the supply of energy from a battery, supported by the battery holder, to the electric motor are all mounted upon the base plate. An operating handle for the electric switch is accessible from outside the cavity. A pump support member formed on the base plate includes an air passageway for supplying air from the pump to the inlet portion of the check valve.

BRIEF DESCRIPTION OF THE DRAWINGS

FIG. 1 is a perspective view illustrating an aerated live bait bucket constructed in accordance with the present invention;

FIG. 2 is an exploded perspective view, with a portion broken away, illustrating details of the components of the aerated live bait bucket shown in FIG. 1;

FIG. 3 is an exploded perspective view of the pump and check valve assembly of the aerated live bait bucket shown in FIG. 1;

FIG. 4 is a side elevation cross-sectional view, with the upper portion of the aerated live bait bucket shown in FIG. 1 broken away;

FIG. 5 is a top elevation view of the aerated live bait bucket shown in FIG. 1, taken along the line 5—5 in FIG. 4;

FIG. 6 is a bottom perspective view of the aerated live bait bucket shown in FIG. 1, with the top and a portion of the side broken away;

FIG. 7. is an exploded perspective view of the base plate of the aerated live bait bucket shown in FIG. 1;

FIG. 8 is a cross-sectional view of one of the fingers which latch the base plate to the main body of the aerated live bait bucket shown in FIG. 1; and FIG. 9 is an electrical circuit diagram of another embodiment of the present invention.

DESCRIPTION OF THE PREFERRED EMBODIMENT

Referring to FIG. 1 of the drawings, the aerated live bait bucket 10 of this invention is shown to include a bucket 12, with a base extension 14, a handle 16, and a lid 18. In a typical manner, the bucket handle is formed of wire 20 with an enlarged grip member 22. The lid 18 is provided with a handle 24 for ease of removal of the cover from the bucket 12. An opening 25 is formed in the lid 18 under the handle 24 for the purpose of permitting air to escape from the bucket. The base extension 14 is provided with a first aperture 26, in which is secured a door 28. The door 28 provides access to an electrical battery as will hereinafter be explained. A second aperture 30 provides access to a switch handle 32. Slots, one of which 34 is shown, are also provided in the sidewall of the base extension 14 for engagement by arms which secure a base plate of the aerated live bait bucket to the base extension 14, as will hereinafter be explained.

Referring to FIG. 2, a portion of the sidewall of the bucket is broken away at 36 to reveal the bottom 38 of the bucket, which is located at the top of the base extension 14. An aperture 40 is provided at the center of the bottom 38 for the purpose of providing a way of introducing air into the bucket 12 through a check valve 42. The check valve 42, as shown, has a threaded base 44, a body 46, and a nozzle 48. In a customary manner, the body 46 contains a rubber diaphragm or other type mechanism which will permit flow through an aperture in the threaded base 44 and out through an aperture 50 in the tip of the nozzle 48. In accordance with the customary operation of a check valve, backflow through the aperture 50 in the nozzle 48 and through the body 46 to the aperture in the base 44 is prevented.

Air is supplied to the check valve 42 by an air pump assembly 52. The air pump assembly 52 is supported on a base plate 54. Parts of the air pump assembly formed integral with the base plate 54, include a support member 56 and horizontal and vertical air passageways 58 and 60 respectively. While not shown, the upper end 62 of the vertical air passageway 60 is internally threaded to receive the threaded base 44 of the check valve 42. A support member 64 projects from the underside of the bottom 38 of the bucket surrounding the aperture 40. A bore formed in the support member 64 is sized to snuggly engage the outside wall of the passageway 60. An O-ring or other type of sealing gasket 66 is placed over the threaded base of the check valve 42, such that as the check valve is threaded into the vertical passageway 60, the O-ring is compressed between the underside of the body 46 of the check valve and the top surface of the bottom 38, to prevent the leakage of water in the bucket 12, through the aperture 40. As shown in FIG. 6, a chamfer 68 is provided at the free end of the cylindrical support member 64 to aid in locating the upper end 62 of the vertical passageway 60 in the bore of the support 64 during assembly.

Referring particularly to FIGS. 3, 4, 5, and 7, the air pump assembly 52 includes a diaphragm type pump 70 which is driven by an electric motor 72. An eccentric drive member 74 is provided at the end of the motor drive shaft 76 to drive a plunger 78 of the air pump 70. The air pump 70 includes a bellows like member 80, one end 82 of which is connected to the plunger 78, and the other end 84 of which is secured around a pump housing 85. The end 82 of the bellows is sealed so as to prevent the flow of air therethrough. The other end 84 of the bellows is secured in an air tight relationship to the pump housing 85. Air is admitted to and expelled from the inside of bellows 80 through a pair of oppositely acting check valves which are secured in the pump housing 85 and communicate on one side with the inside of the bellows 80.

Referring to FIG. 4, one of the check valves (not shown) permits air to flow from within the bellows 80 through a tube 88 formed integrally with a pump base 86, to the horizontal passageway 58, to the vertical passageway 60 and then through the check valve 42 into the bottom of the bucket. A gasket such as O-ring 89 provides an airtight seal between tube 88 and pump base 86, while a gasket 87 is interposed between the pump housing 85 and pump base 86 to provide an airtight seal therebetween with respect to air flow from within the bellows 80 to the tube 88. Pump housing 85 is secured to pump base 86, with gasket 87 therebetween, by a fastening member such as a screw (not shown). A second check valve (not shown) permits air to flow from a passage 90, between the support member 56 and the pump base 86 through a hole (not shown) in pump base 86 and gasket 87, or around gasket 87 into the bellows 80.

As is best seen in FIGS. 3 and 7, the motor 72 is supported from pump base 86 by an pair of parallel fingers 92 and 94 extending therefrom. The fingers 92 and 94 are of a predetermined length, such that the eccentric drive member 74 is properly positioned to engage an aperture 96 in plunger 78. The pump base 86 is supported by the support member 56, being secured thereto by a conventional means, such as screws which are not shown.

In addition to the air pump assembly, the bottom cover also supports a battery 98, and a switch 100, which controls the supply of electrical energy from the battery 98 to the electric motor 72. A battery support member 102, comprises a vertical wall 104, and two triangular braces 106. Secured to the wall 104 of the battery support member 102 is a battery holder 108. The battery holder includes a pair of U-shaped spring clips 110 and 112, the free ends of which are shaped to engage the cylindrical wall of battery 98. Contact arms 116 and 118, which are supported by the vertical wall 104, and are secured thereto in a conventional manner, make contact with opposite ends of the battery 98.

Referring to FIG. 5, a lead 120 is connected at one end to contact arm 116 by a connector 122, and at the other end to one terminal 124 of switch 100. A second terminal 126 of switch 100 is connected by a lead 128, to a motor terminal 130. A lead 132 is connected at one end to contact arm 118 by a connector 134, and at the other end to a second motor terminal 136.

As is best seen in FIG. 7, an upstanding switch support member 138 is provided on the base plate 54 to support the switch 100. The switch is provided with a pair of flanges 140 and 142, which are received in slots 144 and 146 respectively, formed in switch support member 138. The slots 144 and 146 are formed behind a chordal wall 148, which is spaced from the circumference of the base plate 54 by a pair of radially extending walls 150 and 152.

Referring to FIGS. 6 and 7, three upstanding arms 154, 156, and 158 on base plate 54, and three slots 34, 160, and 162 in base extension 14, provide a means for securing the base plate 54 to the base extension 14. The arms 154, 156, and 158 are provided at their free ends with outwardly projecting teeth 166, 168, and 170, which are received in slots 34, 160, and 162.

The aerated live bait bucket of this invention is designed to not only provide superior aeration of the water in the bucket, but also to reduce the cost of the components used in its assembly and to provide ease of assembly. In the preferred embodiment of this invention, the motor support member 56, the horizontal passageway 58, the vertical passageway 60, the battery support member 102, the switch support member 138, and the arms 154, 156, and 158 are all formed integral with the base plate 54, as a single injection molded plastic part. The components mounted on the base plate are secured thereon on as a subassembly, prior to securing the base plate to the base extension 14. As a first step in assembling the subassembly, the pump base 86, with the pump 70 and motor 72 preassembled thereon, may be secured to the support member 56. Similarly, the battery holder 108 is secured to the battery support member 102. To assemble the switch to the base plate 54, it is only necessary to slide the switch flanges 140 and 142 into the slots 144 and 146.

If slide or snap together connectors are used in connecting the ends of the leads 120, 128, and 132 to the various terminals, it may be most convenient to make the connections after the battery holder 108, switch 100 and motor 72 are attached to the base plate 54. However, if the connections are made by soldering, it may be more convenient to make the electrical connections before the components are attached to the bottom cover.

After the subassembly including the base plate is completed, the base plate is inserted into the base extension 14, oriented such that the arms 154, 156, and 158 are in alignment with the slots 34, 160, and 162. One of the arms and one of the slots is made with a different width than the other two, such that the base plate 54 can be secured in the base extension in only one position. This required orientation will assure that the battery door 28 is located adjacent the battery 98, and the switch 100 is located behind aperture 30. As the base plate is inserted into the base extension 14, the arms 154, 156, and 158 are deflected as shown in dashed lines 172 in FIG. 8. When the teeth 166, 168, and 170 reach the slots 34, 160, and 162, they are naturally deflected into the slots as shown solid lines in FIG. 8. To assure that the base plate is not inserted too far into the base extension 14, four ribs 174, 176, 178, and 180 are formed on the inner wall of base extension 14. The lower end of these ribs, 182 and 184 for ribs 176 and 178 respectively, as shown in FIG. 6, are located so as to engage the top surface of the base plate 54, just as the teeth 166, 168, and 170 snap into the slots 34, 160, and 162.

When the base plate 54 is in its secured position with respect to the base extension 14, the upper end 62 of the vertical passageway 60 will be located within the cylindrical support 64, being guided therein during insertion by the chamfer 68. Assembly is completed by screwing the check valve threads into the threads formed in the upper end of the vertical passageway 60. Sufficient torque should be applied to the check valve to assure that a water tight seal is formed between the lower side of the check valve body 46, and the bottom 38 of the bucket by the O-ring 66. Projection 181 extends from the bottom to engage the switch 100 to hold it in position in the switch support member 138.

Following assembly, to utilize the aerated live bait bucket, it is only necessary to remove the door 28, install the battery 98, replace the door, and after filling the bucket with water, move the switch handle 32 to the proper position to energize the motor 72. Rotation of the motor shaft 76 will cause rotation of the eccentric drive member 74, which will in turn cause reciprocal movement of the plunger 78. Reciprocal movement of the plunger 78 causes the flexible bellows to be alternately compressed and extended, thereby changing its internal volume. This in turn causes air to be alternately drawn into the bellows through a first check valve and then discharged into the horizontal passageway through the second check valve. The air passes through the horizontal passageway 58, to the vertical passageway 60, through the check valve 42, into the bucket as shown in FIG. 4.

Another preferred embodiment of the electrical circuit of this invention is shown in FIG. 9. Taking into consideration that the amount of air necessary to maintain the oxygen level in the water may vary depending upon the type and number of live bait bodies therein, the motor could be provided with two windings, or tapped winding, to permit two speeds of operation. In this instance the switch would be provided with two "on" positions and one off position. Two speed operation of the motor could also be provided by replacing the single battery 98, with two or more batteries, such as batteries 186 and 188 in FIG. 9. In this instance the switch 190 is a two pole three position switch. With the switch contacts in position "s", the motor is energized for higher speed operation by batteries 186 and 188 connected in series. With the switch contacts in position "p" the motor is energized for lower speed operation by batteries 186 and 188 connected in parallel. Further, in this alternate embodiment of the invention, a connector 192 is provided in the sidewall of base extension 14, whereby if a mating connector is inserted therein, the motor will be energized by an electrical source connected to the mating connector, rather than by the batteries 186 and 188 within the base extension 14. For instance, the source might be the battery of a boat or automobile, with the connection being made through the cigar lighter socket usually provided in such vehicles. Connector 192 is interlocked with a switch 194, such that when a mating connector is inserted in connector 192, the contacts of switch 194 are opened to disconnect the batteries 186 and 180 from the motor 72.

While in accordance with the patent statutes a preferred embodiment of the invention has been shown, various changes may be made in the aerated live bait bucket of this invention without departing from the true spirit and scope of this invention. For instance, the base extension 14 may be formed separate from the bucket 12, and attached thereto by any desirable fastening means, such as by providing a tooth and groove or threaded surfaces on the outer surface of the bottom circumferential surface of bucket 12 and on the inner upper surface of base extension 14. Similarly base plate 54 could be provided with threads on its outer circumference, and corresponding threads on the inner lower surface of base extension 14, to secure the base plate 54 to the base extension 14. Still other mechanical embodiments would not depart from the true spirit and scope of this invention.

What is claimed :
1. An aerated live bait bucket comprising:
 a. a bucket for holding water having a bottom with an aperture formed therein, and sidewalls,
 b. a base extension formed below said bottom and with said bottom forming a cavity,
 c. an air pump mounted in said cavity,
 d. a check valve,
 e. means connecting the output of said air pump through said check valve to said aperture, whereby air pumped by said air pump is introduced into the water in said bucket through said check valve and aperture, said check valve preventing the backflow of water from said bucket through said aperture into said air pump,
 f. a battery holder for holding batteries which supply energy to said pump, g. an electric switch for control of the operation of the pump, and h. a base plate is provided which substantially encloses said cavity, wherein said air pump, said battery holder and said switch are all mounted on the base plate thus facilitating construction of the aerated live bait bucket 2. The aerated live bait bucket of claim 1, wherein a pump support member is provided on said base plate, and said air pump is mounted on said pump support member.

3. The aerated live bait bucket of claim 1, wherein at least one arm having a free end extends from said base plate, a first latching means formed on said free end, at least one second latching means formed on said base extension, said first and second latching means being engaged to secure said base plate to said base plated extension.

4. The aerated live bait bucket of claim 3, wherein at least two arms are provided, with at least one pair of said first and second latching means being sized such that they will not latch with any other second and first latching means respectively, such that said base plate can be secured to said base extension in only one predetermined position.

5. The aerated live bait bucket of claim 3, wherein the first latching means is a projecting tooth and said second latching means is a notch in said base extension sized to receive said projecting tooth.

6. The aerated live bait bucket of claim 1, wherein said air pump is driven by an electric motor mounted in said cavity.

7. The aerated live bait bucket of claim 6, wherein a battery holder is mounted in said cavity to hold at least one battery, which battery supplies energy to said electric motor.

8. The aerated live bait bucket of claim 7, wherein an aperture is provided in said base extension, a door for closing said aperture, said aperture providing access to said batteries for servicing.

9. The aerated live bait bucket set forth in claim 1, wherein said check valve has an inlet portion, said check valve located in said bucket with at least said inlet portion extending through said aperture.

10. The aerated live bait bucket of claim 1, wherein said bucket and said base extension are generally cylindrical in shape, with said base extension being a continuation of the sidewall of said bucket below said bottom, so as to form a generally cylindrical cavity.

11. An aerated live bait bucket comprising:
a. a bucket for holding water having a bottom with an aperture formed therein, and sidewalls,
b. a base extension formed below said bottom and with said bottom forming a cavity,
c. a base plate substantially enclosing said cavity,
d. a pump support member on said base plate,
e. an air pump mounted on said pump support member in said cavity,
f. a check valve, and
g. an air passageway having first and second ends formed in said pump support member, said first end of said air passageway receiving the output of said air pump, said second end of said air passageway delivering said output through said check valve and aperture to the water in said bucket, whereby air pumped by said air pump is introduced into the water in said bucket through said check valve and aperture, said check valve preventing the backflow of water from said bucket through said aperture into said air pump.

12. The aerated live bait bucket of claim 11, wherein said second end of said air passageway is adjacent said bottom and said check valve has an inlet portion, said check valve located in said bucket with at least said inlet portion extending through said aperture and being connected to the second end of said air passageway.

13. The aerated live bait bucket of claim 12, wherein a support member is formed under said bottom surrounding said aperture to receive said second end of said air passageway.

14. The aerated live bait bucket of claim 12, wherein said check valve has an inlet portion, a main body portion and an outlet portion, said main body portion and said output portion being located in said bucket and said inlet portion extending through said aperture and being connected to said second end of said air passageway.

15. The aerated live bait bucket of claim 14, wherein said inlet portion of said check valve and said second end of said air passageway are provided with threads which engage each other to secure said check valve to said air passagewy.

16. The aerated live bait bucket of claim 14, wherein a sealing member is provided between said bottom and said check valve to provide a water tight connection therebetween.

17. The aerated live bait bucket of claim 10, wherein said sealing member is an O-ring which surrounds said inlet portion adjacent said main body portion.

* * * * *